United States Patent

[11] 3,550,751

[72] Inventor William Jack, Jr.
West Kilbride, Scotland
[21] Appl. No. 690,918
[22] Filed Dec. 15, 1967
[45] Patented Dec. 29, 1970
[73] Assignee Baker Perkins Jaxons Limited
Glasgow, Scotland
a British company
[32] Priority Dec. 16, 1966
[33] Great Britain
[31] No. 56432/66

[54] ARTICLE SORTING APPARATUS
11 Claims, 5 Drawing Figs.
[52] U.S. Cl. .................................................. 198/38,
214/11
[51] Int. Cl. .................................................. B65g 47/34
[50] Field of Search .......................................... 198/38;
214/11

[56] References Cited
UNITED STATES PATENTS
2,758,698 8/1956 Freeman ..................... 198/38
2,901,089 8/1959 Rabinow ..................... 198/38

Primary Examiner—Edward A. Sroka
Attorney—Glascock, Holman, Downing & Seebold

ABSTRACT: Article sorting apparatus comprising an endless conveyor following a closed path which passes by a plurality of article receptacles with at least one article carrier for movement by the conveyor around the closed path, a station for delivering articles to the carrier or carriers with means for transferring articles from the or each carrier to a receptacle when the carrier is adjacent the receptacle, control means for preselecting to which receptacle an article being delivered by the or a carrier is to be transferred and for automatically operating the transfer means when the carrier is adjacent the selected receptacle.

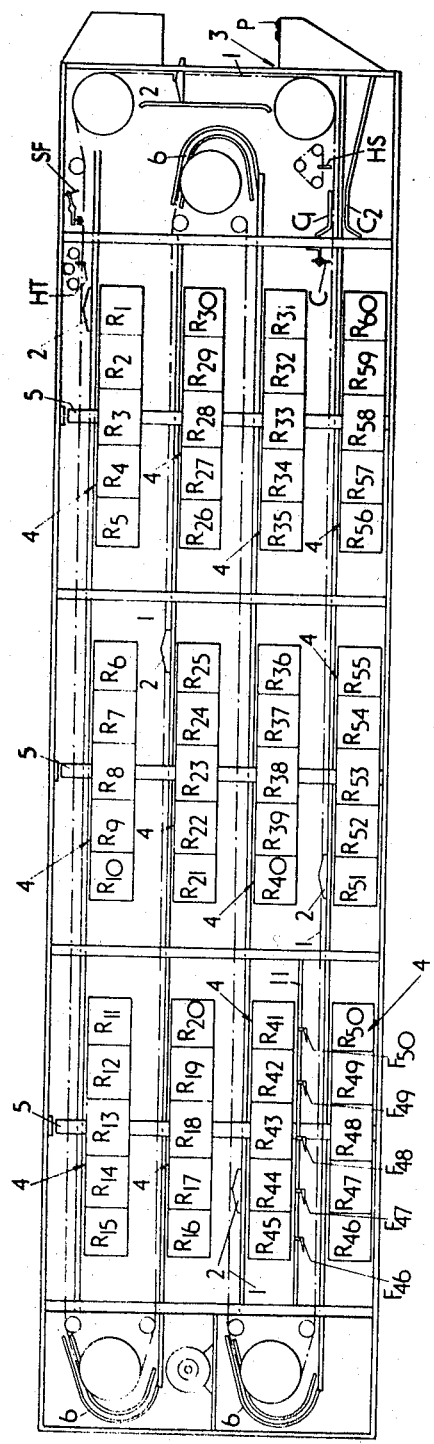
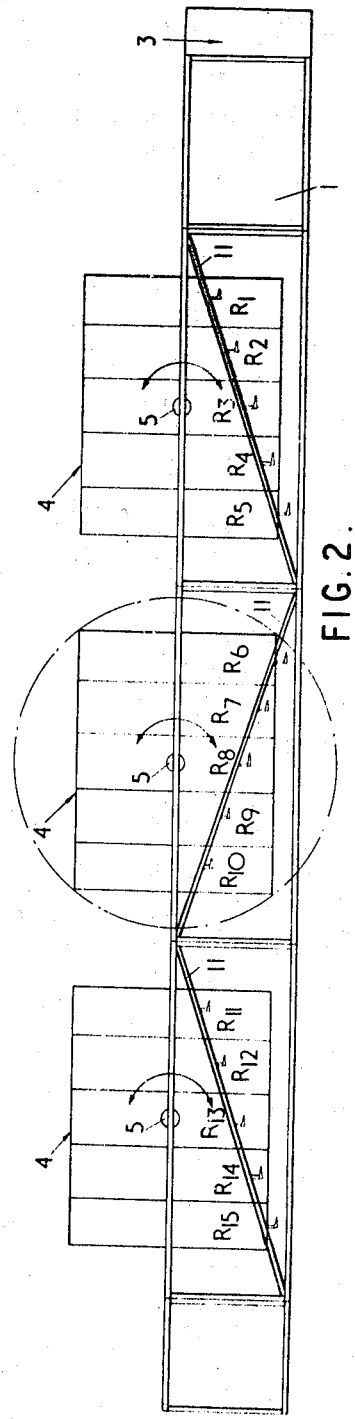
FIG. 1.
FIG. 2.
INVENTOR
WILLIAM JACK, JR.
ATTORNEYS

INVENTOR
WILLIAM JACK, JR.
BY
ATTORNEYS

ARTICLE SORTING APPARATUS

BACKGROUND OF THE INVENTION

This invention relates to the sorting of interdistinguishable articles into groups according to a particular article characteristic.

For example in laundries, laundered articles have to be sorted into groups or individual customers according to their laundry marks. This is commonly done manually, with the operatives sorting the laundry and placing it into vertical rows of receptacles each receiving a group of articles having the same laundry mark. This procedure is known generally in the trade as "racking." Similar procedures are used in postal sorting where items used to be classified according to postal district.

It is an object of the present invention to provide semiautomatic apparatus for sorting interdistinguishable articles into groups according to an article characteristic. It is a particular object of the invention to provide apparatus suited to the semiautomatic racking of laundry articles into groups according to their laundry marks.

SUMMARY OF THE INVENTION

The invention consists in article sorting apparatus comprising endless conveyor means adapted to follow a closed path passing by a plurality of article receptacles, at least one article carrier for conveyance by the conveyor means around said path, a station for delivering articles to the or each carrier, means for transferring articles from the or each carrier to a receptacle when the carrier is by the receptacle, and control means for preselecting to which receptacle an article delivered to the or a carrier is to be transferred and for automatically operating the transfer means when the carrier is by the selected receptacle.

Preferably, the conveyor means is adapted to travel continuously over the receptacles, and the transfer means is operative to allow a carrier to drop an article into the selected receptacle as the carrier passes over this receptacle.

The invention also relates to a control system suitable for use in article sorting apparatus as set out above, for mechanically controlling an operation to be effected when a component movable over a path attains a preselected one of a plurality of positions in the path of movement of the component.

The invention accordingly also consists in a control system for mechanically controlling an operation to be effected when a component movable along a path attains a predetermined one of a plurality of set positions along the path comprising a plurality of presettable operating devices on the component the setting of each of which positions a trigger mechanism associated with the component release of the trigger mechanism initiating said operation, each set position along the path being represented by an operating device or operating device combination, and stationary actuating means at each of said positions along the path, the actuating means at a particular position being adapted to contact a preset operating device or operating device combination representing that position to release the trigger mechanism when the component attains that position.

The invention will now be described by way of an example with reference to the accompanying drawings in which:

BRIEF DESCRIPTION OF THE DRAWINGS

FIG. 1 is a view in semidiagrammatic side elevation of laundry sorting and racking apparatus;

FIG. 2 is a semidiagrammatic plan view of the apparatus shown in FIG. 1;

DETAILED DESCRIPTION OF THE INVENTION

Figure 3:
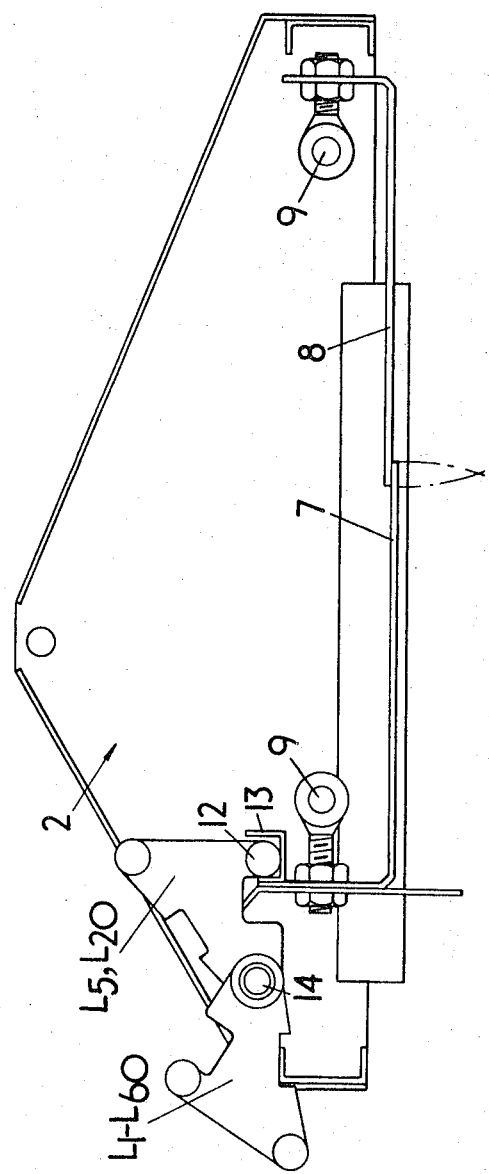
FIG. 3 is a view in side elevation of an article carrier used in the apparatus of FIGS. 1 and 2.

Referring to FIGS. 1 and 2, the apparatus comprises an endless conveyor 1 adapted to have carriers 2 releasably attached thereto at spaced positions along its length, the conveyor following a closed path from an article delivery station 3 around a series of vertically arranged open topped receptacle trays 4, and back to the delivery station. The receptacle trays are arranged in vertically spaced horizontal rows and the conveyor means has a circuitous or tortuous path so that the carriers pass in turn from the delivery station, over each horizontal row of receptacle trays and hence back to the delivery station. Five carriers 2 are shown in FIG. 1, but more or fewer could be used.

According to an important feature of the invention, each receptacle tray provides two back-to-back rows of receptacles, the trays being mounted for swinging movement around common central vertical shafts 5. With the trays in suitable alignment relative to the vertical shaft, the conveyor 1 passes over only one row of receptacles of each tray and by this arrangement, a batch of articles can be sorted into its relevant receptacles, and the trays then swung around through 180° as indicated by the arrows in FIG. 2 so that the filled receptacles can be emptied while the other row of each tray is brought under the conveyor means to have its receptacles filled from a fresh batch of articles. There may be a single group of vertically spaced trays of this type, or a series of such groups dependent on the number of receptacles required, and there can be any number of trays in each group, or even a single tray. In the illustrated embodiment there are three vertical columns of trays each having four superposed trays and each tray having five receptacles on each side. Thus, for each batch of articles to be sorted, there are 60 receptacles $R_1$ to $R_{60}$ available.

The carriers are releasably secured to the conveyor in any convenient manner. In the illustrated embodiment they are pivotally suspended from the conveyor, and any convenient conveyor arrangement well known per se in the conveyor art can be employed to ensure that the carriers remain horizontal while they traverse the turning point rolls at the end of each horizontal run of the path for example guides 6 can be used. Alternatively, the carriers may be supported on each side by a pair of conveyor chains, one supporting the front of the carrier and the other the back, and one chain extending beyond the other at the turning points.

Each carrier 2 (see FIGS. 3 and 4) has a floor comprising a pair of hinged members 7 and 8 which are held up by a trigger mechanism as will be described and which open to drop an article into a receptacle when the trigger mechanism is released by means to be described when the carrier is at a preselected receptacle. Thus, the hinged floor of each carrier provides means for transferring an article by gravity into a receptacle.

A mechanical control system is employed for preselecting at the delivery station at which receptacle the trigger mechanism will be released, and for then releasing the trigger mechanism at this preselected receptacle.

Figure 4:
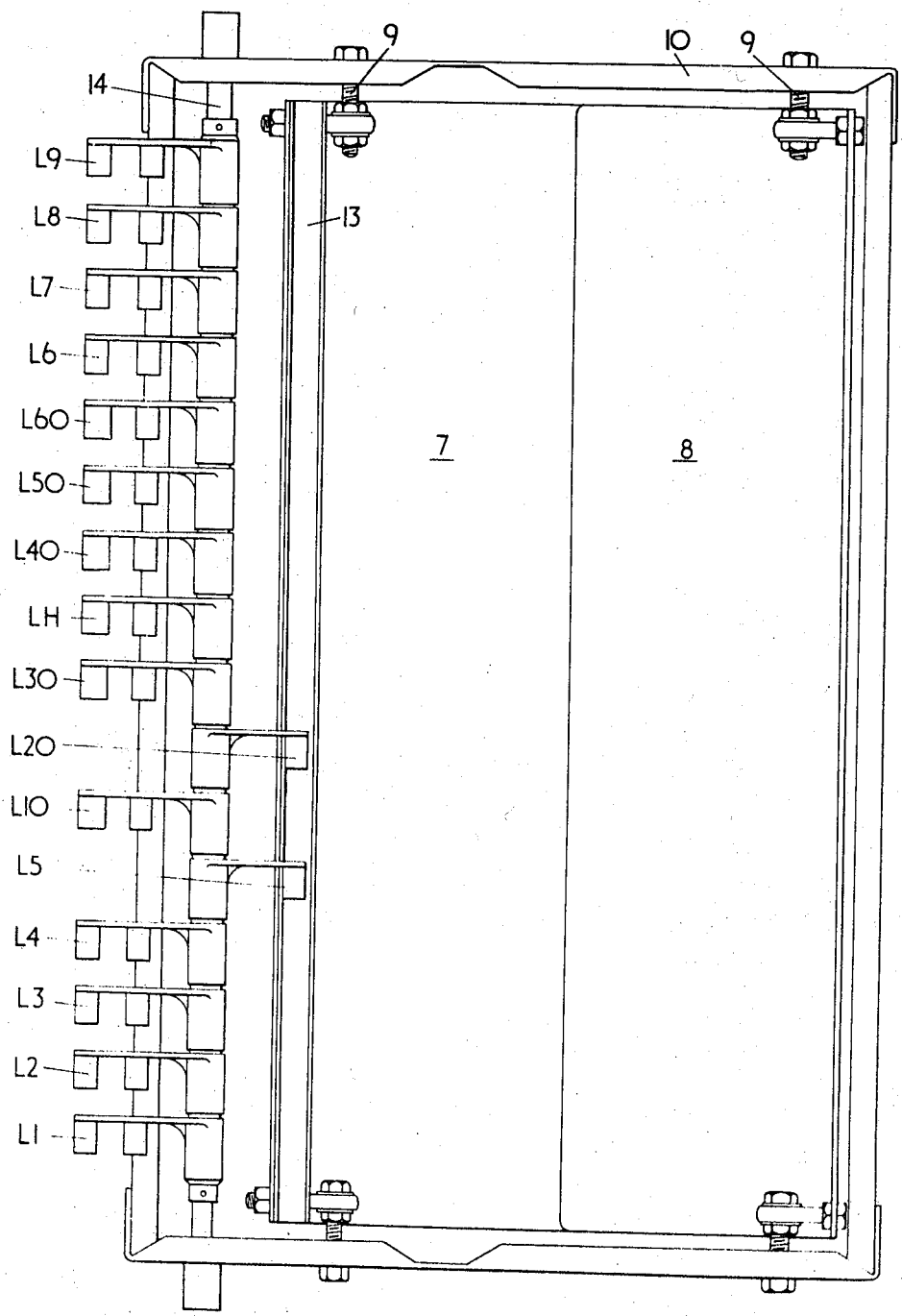
FIG. 4 is a plan view of the article carrier.

The pivotal floor member 7 of each carrier 2 supports the member 8 in closed position, and these members are carried by pivot pins 9 on sidewall members 10. The pivotal member 7 is itself supported by one or more latches $L_1$.........$L_{60}$ as will be described and each of which is pivoted on a bar 14 carried by the sidewalls 10. Each latch has an "on" position in which latch portion 12 thereof locates in a channel 13 formed in the floor member 7 for supporting the floor members and each latch has an "off" position in which its and portion 12 is out of the channel to release the floor members. In FIGS. 2 and 3 the latches $L_5$ and $L_{20}$ are in the "on" position and the remaining latches are in the "off" position.

In the illustrated embodiment there are individual "unit" latches viz devices $L_1$ ........ $L_9$ and individual "tens" latches, viz latches $L_{10}$ ......... $L_{60}$. This arrangement gives a control capacity for 69 receptacles as will become apparent from the ensuing description. There is also a holding latch $L_H$ the function of which will be described later. The latches are spaced along the bar 14 and above each receptacle is a fixed actuating finger F mounted on an inclined bar 11 in the path of the oncoming carriers, with the finger F at each individual receptacle being positioned so that it will contact a latch associated with that receptacle as a carrier passes by to pivot the latch out of its "on" position and release the carrier floor. For example, at each unit receptacle, viz. nos. $R_1$ to $R_9$, actuating fingers $F_1$ to $F_9$ respectively will be positioned to contact latches $L_1$ to $L_9$ respectively and momentarily rock the particular latch out of its "on" position. In the case of the unit receptacles $R_1$ to $R_9$ the actuating fingers are designed as cams which rock the particular latch and return the latch to the "on" position as the carrier passes by. This "rocking" is sufficient to allow the floor members 7 and 8 of a tray to open. At the receptacles which are multiples of 10, viz. receptacles $R_{10}$, $R_{20}$, $R_{30}$, $R_{40}$, $R_{50}$ and $R_{60}$ the actuating fingers $F_{10}$ ..... $F_{60}$ respectively are positioned and designed as cams which positively move the particular latch viz. latches $L_{10}$ ..... $L_{60}$ respectively from the "on" to the "off" position as the carrier passes by. Each receptacle between these latter receptacles, viz. receptacles $R_{11}$ to $R_{19}$, $R_{21}$ to $R_{29}$, $R_{31}$ to $R_{39}$, $R_{41}$ to $R_{49}$, and $R_{51}$ to $R_{59}$ each have an actuating finger positioned and designed to rock one of the "unit" latches away from its "on" position. For example, receptacles $R_{11}$, $R_{21}$, $R_{31}$, $R_{41}$ and $R_{51}$ each have a finger adapted to rock latch $L_1$ while receptacles $R_{14}$, $R_{24}$, $R_{34}$, $R_{44}$ and $R_{54}$ each have a finger adapted to rock latch $L_4$ and receptacles $R_{19}$, $R_{29}$, $R_{39}$, $R_{49}$ and $R_{59}$ each have a finger adapted to rock latch $L_9$.

Basically, the fingers in respective multiples of 10 causes the appropriate "tens" latch to pivot in a counterclockwise direction out of the channel 13 and remain out of such channel while all of the actuating triggers or fingers 1—9 are so shaped as to cause the appropriately numbered latch to be lifted from and allowed to be dropped back into the channel and it is for this reason that the term "rock" has been employed.

Figure 5:
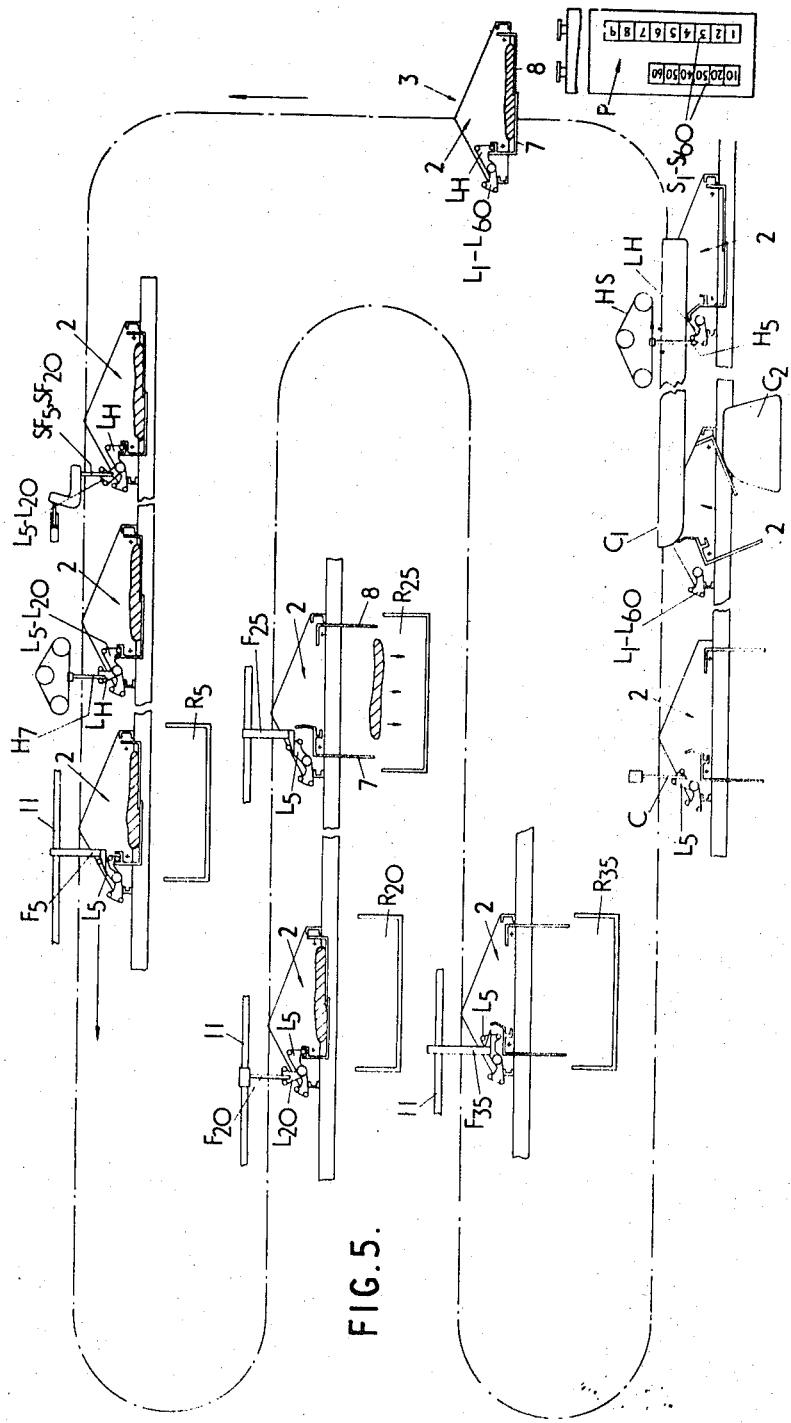
FIG. 5 is a diagrammatic view to explain the operation of the apparatus.

At the article receiving station there is a control panel P having switches with each corresponding to one of the carrier operating devices, i.e. individual "unit" switches $S_1$ to $S_9$ and individual "tens" switches $S_{10}$ to $S_{60}$. Each of these switches, when actuated, causes one of a plurality of setting fingers $SF_1$-$SF_6$ to be lowered into the path of an oncoming carrier in a position to set the latch with which it is associated in the "on" position. An empty carrier as illustrated in the bottom run or flight of the conveyor in FIG. 5 is moving from left to right and its hinged members 7 and 8 are lifted to the closed position by engagement with stationary cams C1 and C2. While the carrier is held in this position, the holding latch LH is engaged by the holding latch setting mechanism HS thereby causing the latch LH to pivot in a clockwise direction about the bar 14 causing the portion 12 of the latch to engage within the channel 13 in the member 7 and thereby hold the members 7 and 8 in the raised or horizontal position.

The carrier continues around the circuit and passes beneath the setting fingers SF as indicated in FIG. 1 and by way of example in FIG. 5 at SF 5–SF 20. The setting fingers in respect of all of the latches are mounted in side by side relationship on a common shaft in the same order as the latches are disclosed in FIG. 4. By selecting station 25, depression of the switches S20 and S5 will cause the setting fingers SF20 SF5 to be lowered into the path of the oncoming carrier.

Fingers SF20 and SF5 will engage latches L20 and L5 as they move with the carrier from right to left and this action will cause the latches to pivot in a clockwise direction about the bar 14 and the portions 12 of each latch will engage within the channel 13. In FIG. 3, the latch L20 is illustrated in the holding position, namely the portion 12 is within the channel 13 while the other portion is more or less vertically thereabove ready to be engaged by the actuating trigger F20 at the receptacle R20. The latches which have not been employed are illustrated as LI–L60.

The carrier as disclosed in FIG. 3 is moving from right to left and prior to engagement with the setting finger or fingers, only the holding latch is engaging the channel 13. When the carrier reaches the setting finger, the portion 12 will engage it and the continued movement of the carrier will result in the latch pivoting in a clockwise direction. At this point, it may appear that the other portion will then strike the setting finger because this will be located between the end portions and the line extending between L1–L60 in FIG. 3 and indicating the latches serves to show this condition. However, the latch will not engage the finger other than by the portion 12 because the other portion is always moving to the left even while it is being rotated in a clockwise direction about the shaft 14. When the end portion 12 starts to descend into the channel 13, the other end portion of the latch is moving through its own arcuate path which does not intercept with the setting finger but is in fact spaced to the left of the finger.

Remaining features of the control system will become apparent from the following description of the operation of the apparatus with particular reference to FIG. 5.

As a laundry article is received at the receiving station, an operator determines from its laundry mark to which receptacle the article is to be delivered and deposits the article in a carrier 2 proceeding past the delivery station. The operator also depresses one or a pair of switches on the control panel corresponding to the chosen receptacle. For example, if the article is to proceed to receptacle $R_{25}$,the operator depresses switches $S_{20}$ and $S_5$. The carrier as it passes the delivery station has its floor members held in the up or closed position by the holding latch $L_H$ which has previously been set by a holding latch setting mechanism $H_S$.

Depression of switches $S_{20}$ and $S_5$ causes the setting fingers $SF_{20}$ and $SF_5$ to be moved down into position to knock the latches $L_{20}$ and $L_5$ into the "on" position as the carrier 2' passes thereunder. Then, the carrier passes under a member $H_7$ travelling at twice the speed of the conveyor which moves the holding latch to the "off" position. When the carrier passes over receptacle $R_5$, latch $L_5$ is rocked away from and back to its "on" position by finger $F_5$ and then when the carrier passes over receptacle $R_{20}$, latch $L_{20}$ is moved by finger $F_{20}$ to the "off" position. When the carrier is over receptacle $R_{25}$ finger $F_{25}$ rocks latch $L_5$ away from the "on" position, which is sufficient to effect opening the floor members R thus allowing the laundry article to fall into receptacle $R_{25}$. The carrier then proceeds around the conveyor circuit with the floor members open and latch $L_5$ in its "on" position though not in the channel in floor member 7. A fixed clearing bar C (FIG. 1) spanning the width of the carrier then moves any latch still in the "on" position to the "off" position as the carrier passes thereunder (in the illustrated example the bar operates on latch $L_5$) and subsequently stationary cams $C_1$ and $C_2$ pivot the floor members back to the closed position and hold them closed until the setting finger member $H_S$, travelling at twice the speed of the conveyor, moves the holding latch LH into the "on" position. The carrier then is in condition to receive a further laundry article at the receiving station for a subsequent carrier cycle which is repeated in like manner to the above described example for any switch or switch combination depressed by the operator.

It will be readily appreciated from the above description that for any "unit" receptacle $R_1$ to $R_9$, depression by the operator of the single unit switch associated with that receptacle will cause release of the carrier floor at the particular receptacle and that for any other receptacle, depression of one of the "tens" switches and one of the "unit" switches will effect release automatically of the trigger mechanism at the relevant receptacle.

I claim:

1. An article sorting apparatus comprising a plurality of article receptacles, at least one article carrier, conveyor means for transporting said carrier sequentially past said receptacle, an article loading station, article transfer means associated with said carrier for transporting an article from said carrier to a chosen receptacle when the carrier is by said receptacle, a transverse bar on said carrier, a plurality of pivoted latches on said bar, each latch having a transfer means holding position whereby the transfer means is operated at a receptacle only if all the latches are out of their holding positions, and stationary abutment means at each receptacle, each abutment means being positioned to contact a different one of the latches when the carrier is conveyed past said receptacle if the latch is in its holding position to pivot the latch out of its holding position whereby an article can be delivered to a selected receptacle by appropriate setting of the latches when the article is loaded onto the carrier at the loading station.

2. The apparatus as claimed in claim 1, in which the conveyor means is adapted to travel continuously over the receptacles and the transfer means is operative to allow a carrier to drop an article in the selected receptacle as the carrier passes over this receptacle.

3. The apparatus as claimed in claim 1 in which the receptacles are arranged in two interchangeable groups with the conveyor means adapted to pass by only one of the groups so that one group of receptacles can be loaded with sorted articles, then interchanged with the other group of receptacles and unloaded while articles are loaded into the other group of receptacles.

4. The apparatus as claimed in claim 3 including a common vertical shaft, the receptacles of one group being mounted back to back with receptacles of the other group on opposite sides of the common vertical shaft for swinging movement about the shaft, and the conveyor means only passing by receptacles on one side of the common vertical shaft.

5. The apparatus as claimed in claim 1 in which the carrier is provided with an opening floor constituting the transfer means, and each latch member in its holding position being adapted to hold the floor closed.

6. The apparatus as claimed in claim 5 in which said floor comprises a pair of pivoted plate members, one of said members having a channel, and said latches having end portions which fit in the channel in the holding position of the latches for holding the floor closed.

7. The apparatus as claimed in claim 1 in which a plurality of receptacles have stationary abutment means adapted to contact and pivot the same latch out of its holding position as the carrier passes by said receptacles and to return the latch to its holding position.

8. The apparatus as claimed in claim 1 including means for selectively setting at least one of the latches in their holding positions, said means comprising a plurality of setting members selectively movable into the path of movement of the carrier, with each setting member being adapted to contact a different latch as the carrier passes by to set the latch in its holding position.

9. The apparatus as claimed in claim 8 including a control panel at the article loading station for remotely actuating the setting members.

10. The apparatus as claimed in claim 8 in which the carrier has an opening floor constituting said transfer means, stationary cam means for contacting the carrier floor after the carrier has passed by all the receptacles for closing the floor, a holding latch pivoted on said transverse bar of said carrier for holding the floor closed until the setting means operates, means for moving the holding latch into holding position when the floor is closed, and means for moving the holding latch out of the holding position after operation of the setting means.

11. An article carrier for sorting apparatus as claimed in claim 1, said carrier including a pair of pivoted plate members defining an opening carrier floor, one of said plate members being longer than the other of said plate members for supporting the floor in closed position, an upwardly opening channel provided on said one floor member, a transverse bar, and a plurality of pivoted latch members on said bar, each latch member having a floor holding position in which an end portion of the latch locates in said channel for supporting said plates in a floor closing relation, and each latch having an opposite end portion projecting upwardly in the floor closing position of the latch for pivoting the latch out of its floor holding position.